Figure 1:
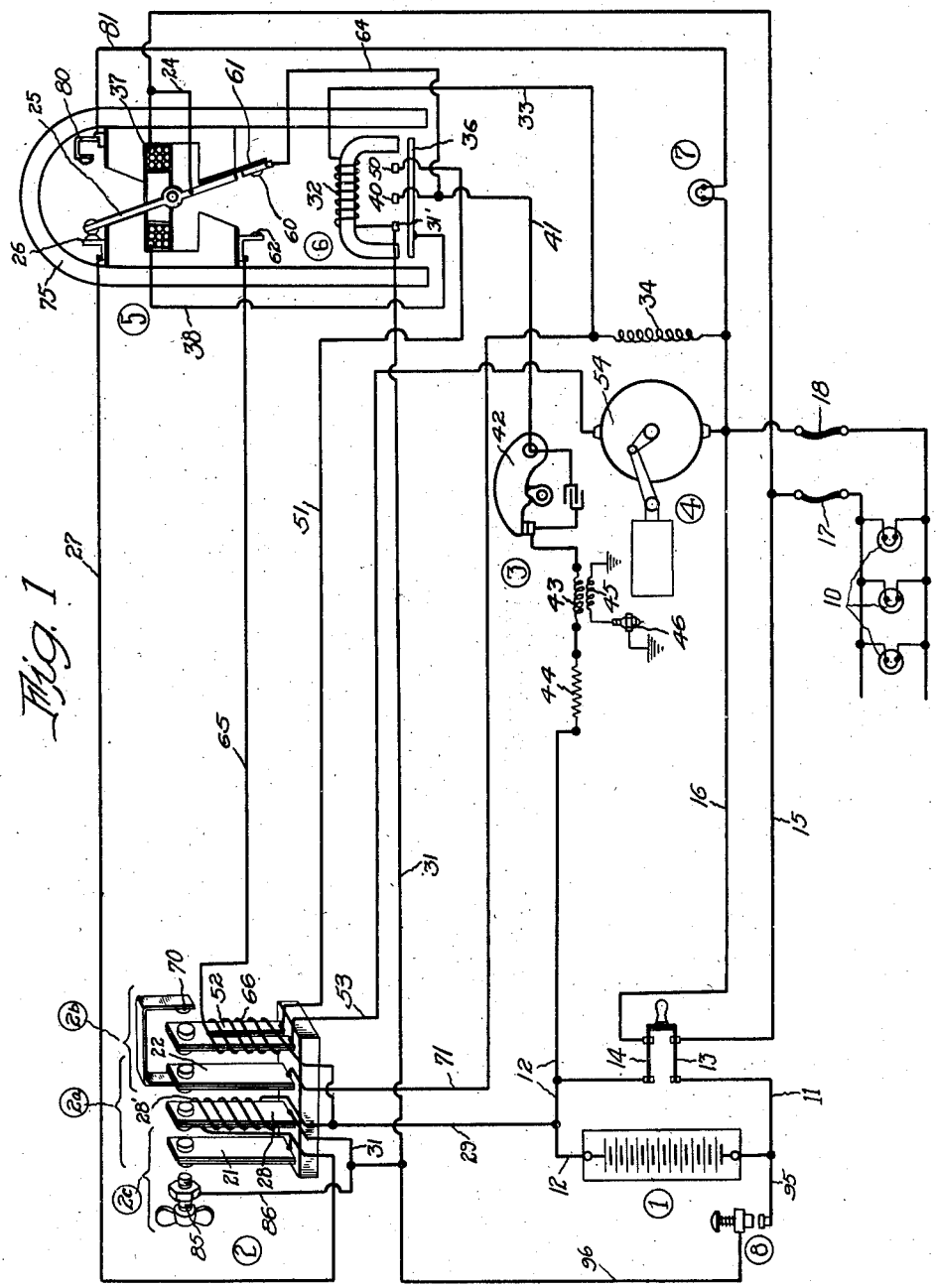

Dec. 10, 1929.   J. B. REPLOGLE ET AL   1,738,540
SYSTEM OF GENERATING AND STORING ELECTRICITY
Filed May 19, 1919   4 Sheets-Sheet 1

WITNESS

INVENTORS
JAMES B. REPLOGLE
BY  JOHN M. LEA
ATTORNEY

Starting
(Low Voltage)

Starting
(2nd Position–Cranking)

Dec. 10, 1929.    J. B. REPLOGLE ET AL    1,738,540
SYSTEM OF GENERATING AND STORING ELECTRICITY
Filed May 19, 1919    4 Sheets-Sheet 3

Charging.

Stopping
(High Voltage)

WITNESS

INVENTORS
JAMES B. REPLOGLE
JOHN M. LEA
BY
ATTORNEY

Dec. 10, 1929.   J. B. REPLOGLE ET AL   1,738,540
SYSTEM OF GENERATING AND STORING ELECTRICITY
Filed May 19, 1919   4 Sheets-Sheet 4

*Stopped*
*(Voltage Normal)*

*Stopping*
*(Engine Failure)*

WITNESS

INVENTORS
JAMES B. REPLOGLE
JOHN M. LEA
BY
ATTORNEY

Patented Dec. 10, 1929

1,738,540

UNITED STATES PATENT OFFICE

JAMES B. REPLOGLE AND JOHN M. LEA, OF DETROIT, MICHIGAN, ASSIGNORS TO DELCO-LIGHT COMPANY, OF DAYTON, OHIO, A CORPORATION OF DELAWARE

SYSTEM OF GENERATING AND STORING ELECTRICITY

Application filed May 19, 1919. Serial No. 298,160.

The present invention relates to a system of generating and storing electricity, the general object being to provide a practical commercial system or unit which will operate with a maximum degree of efficiency and require a minimum amount of attention. The complete unit, as comprised in the preferred embodiment of the invention, includes a battery, a hydrocarbon engine, a generator-motor, and means, responsive to the condition of charge of the battery, for controlling the operation of the engine and generator-motor in such manner as to maintain the voltage of the battery within narrow predetermined limits.

One of the primary objects of the invention is to provide a system or unit of the type set forth wherein but little energy is required for operating the controlling means, the latter being, nevertheless, positive in its action, whereby the battery is relieved from objectionable drains or losses and the proper and certain functioning of the system is insured.

A further object is to provide a system or unit of the type stated wherein the controlling means is for practical purposes free from friction effect.

Again, the invention aims to provide a system or unit which is governed in a positive manner by the actual voltage of the battery, and regardless of internal differences in the battery throughout its use and life. In this manner, the control may be exercised within much closer limits than would be possible, for example, if it should be made dependent on the ratio of energy delivered from the battery to energy supplied thereto, the result being that the system as a whole may be maintained on an efficient operating basis.

Another primary object is to provide a current distributing system wherein the control is substantially the same regardless of ordinary variations in temperature, that is, the same in winter as in summer.

A further object is to provide a battery charging system arranged to automatically disconnect the generator from the battery and to stop the engine whenever the generator voltage falls below that of the battery, as for example, when the battery is approaching full charge and the voltage control has not yet operated, or when the generator voltage falls off due to the slowing up or failure of the engine drive.

Another object is to provide a distribution system having engine operated means for charging the battery, in which the engine is adapted to be stopped when the main distribution circuit is opened.

A further object is to provide means for automatically breaking the circuit through the generator operating as a motor in the event of engine failure to prevent fruitless cranking of the engine.

Another object of the invention is to limit the time of engine cranking under an adverse condition, to the nature of the adverse condition itself, for example, when in cranking the engine the generator armature is rotating and the rate of discharge of the battery is relatively slow, the disconnection is delayed for a considerable period in the hope of restoration of favorable conditions; on the other hand, when the generator armature is mechanically prevented from rotation, the rate of discharge of the battery is quite high and the disconnection is made in a relatively short time.

Again, the invention provides an alarm arranged to be set in operation upon any flow of current from the battery through the generator-motor either at engine starting or afterwards. The alarm remains in operation so long as current flows from the battery to the generator-motor and, if the generator has been disconnected by reason of engine failure, then also until the cause of engine failure is removed and the engine is put in operation. Operation of the engine to cause a reversal of current in the main circuit to charge the battery discontinues the alarm.

Another object is to provide an installation of such nature that the main circuits (ignition, field, generator armature) are all made and broken by a single relay, itself subject to control by the voltage responsive device.

Another object is to insure the proper functioning of the apparatus by maintaining the temperature of the environment above a predetermined minimum, so that the cooling liquid may not freeze or the lubricating oil tend to congeal or the fuel fail to vaporize properly.

Another object is to provide a simple means for manually starting the generator in the event the system has been put out of action by some condition which may not indicate breakage or injury to the mechanical or electrical parts, as is the case when the fuel becomes exhausted.

Various other objects and features will be indicated hereinafter.

In the drawings, Fig. 1 shows the complete circuit, the various component elements or devices appearing diagrammatically, and in the relative positions they occupy when the battery voltage is between the desired limits and the engine and generator are not operating.

Figs. 2 to 7 are diagrammatic views showing the circuit connections under various conditions of operation of the present invention.

The preferred embodiment of the invention, it is thought, will be best understood initially by pointing out and commenting on its main constituent elements, which are:

1st. The storage battery (1).

2nd. A temperature compensated voltage control device ($2^a$) a thermostatic safety cut-out device ($2^b$) and a minimum environment temperature control device ($2^c$), which devices in the present instance are combined in a single piece of apparatus (2) comprising four thermostat blades.

That portion ($2^a$) of the apparatus which goes to make up the voltage control device proper consists of three of these blades, one being wound with resistance material which is preferably connected across the terminals of the battery and which, therefore, tends to raise the temperature of said winding above that of the surrounding atmosphere by an amount proportional to the square of the current flowing therethrough. When the apparatus which is intended to receive current from the battery is arranged to operate on a normal voltage circuit, say 110 volts, for example, the three blades may be so mounted that the wound blade is in contact with one of the other two when 102 volts potential is across the winding, and in touch with the other one when 122 volts is across the winding.

It will be understood that the several thermostat blades have their corresponding ends fixed to a suitable base, that the construction of each is the same, and that their corresponding metals face substantially the same direction. Therefore, the variation in the temperature of the surrounding air, that is, the environment temperature, has no influence on the relative position which the blades maintain with respect to one another when they are at substantially the same temperature, all three swinging equally to the right or to the left as the case may be. Of course, there is some difference in the effect of the heating coil 28' on the thermostat blade 28 in winter and in summer owing to the greater heat radiation of the thermostate blade in winter, but such variation is comparatively small as compared to the variation due to the movement of the thermostat blades 21, 28, and 22 collectively. In practice the voltage control device is generally enclosed within a confined space or housing which protects the voltage control device to a certain degree and for all practical purposes renders its operation almost, if not entirely free from environment temperatures. In this connection, it is obvious that the actual movement of any two of the associated blades in respect to one another is determined by the movement of the ends of the corresponding blades in respect to their bases. Since such movement is proportional to the actual length of the blades themselves, one means of obtaining any desired compensation resides in merely varying the relative lengths of the blades.

We are aware that other control apparatus, dependent more or less on the condition of charge of the battery, might be employed, but no such device with which we are familiar would prove, in the matter of efficiency, equivalent to that shown.

That portion ($2^b$) of the apparatus wherein the safety cut-out device is embodied includes in the present instance a wound bifurcated thermostat blade, otherwise similar to the three above mentioned blades, (being mounted on the same base and having its different metals arranged in the same order) adapted to complete a circuit to divert current from the main control relay, hereinafter referred to, upon the occurrence of abnormal conditions for more than a predetermined length of time. In the present instance, also, this bifurcated blade is made to operate at different speeds, depending on the nature of the condition against which it is a safety guard; for example, current is passed through its winding to cause it to operate relatively slowly when the generator armature is rotating as a motor and the field is excited, but in the event the generator is prevented from turning or the field is not excited, a relatively heavy current then passes directly through the metal of the bifurcated blade and causes a more rapid heating thereof. The element ($2^b$), in this particular embodiment, also includes one of the three first mentioned blades arranged to co-operate with the bifurcated blade to complete said circuit or circuits in a manner substantially independent of environment temperature.

That portion ($2^c$) of the apparatus wherein the minimum environment temperature control device is embodied includes a contact arranged to be engaged by the low voltage blade of device ($2^a$) when the surrounding temperature reaches the predetermined exceptional and undesirable minimum and thereupon functioning to initiate the generating operation of the system, following which the ordinary heat losses, with the possible exception of the exhaust, are utilized to elevate the temperature of the environment.

Because of the thermostatic nature of the parts (making possible an exceptionally rugged construction) involved in devices (2ª), (2ᵇ) and (2ᶜ) their operation is rendered certain, the several contacts and electrical connections controlled thereby being made in the most positive manner; and the apparatus is, moreover, free from friction effect such as inheres in ordinary devices wherein two or more parts have relative rotative or sliding movement. Both of the devices (2ª) and (2ᵇ) function independently of environment temperature, that is, the same in winter as in summer. While it is highly desirable for manufacturing reasons to so arrange the parts that portions of the device (2ª) may serve as elements also of the devices (2ᵇ) and (2ᶜ), it is obvious that said dual-function parts may in each case be replaced by devices in duplicate, the first of which accomplishes one function while the second accomplishes the other. It will be clear, also, that the blade which has been described as "bifurcated" need not necessarily be so constructed, this particular form being assumed largely for the convenience it affords in the matter of attachment of the associated conductors.

3rd. An ignition coil, breaker and condenser (3) so arranged that it will function on a voltage between the limits at which the battery is to be maintained.

4th. A generator-engine unit (4) the generator part of which has sufficient energy to crank the engine properly when running as a motor connected to the battery, and which will deliver the proper current when driven by the engine as a generator.

5th. A polarized relay (5) which causes the winding of the thermostatic blade 52 mentioned in device (2ᵇ) to have current passed therethrough when the energy flows from the battery to the generator to crank the engine, and which cuts off the current from the winding of said thermostatic blade when the energy flows from the generator to the battery or line. This relay also controls the current through the winding of the thermostatic element (2ª) connecting it to the battery when conditions are normal and disconnecting it therefrom when conditions are abnormal; again, it controls the operation of the alarm, hereinafter referred to.

6th. A main relay, contactor, or electromagnetically operated switch (6), the winding of which is connected in series with the field of the generator, and which, when energized connects with the positive side of the battery (1), the ignition (3), the armature of the generator (4), and an additional contact which completes the field circuit independently of the thermostatic control (2).

7th. An alarm (7), which may be in the form of a light, a bell or a horn, which indicates an alarm during engine cranking and whenever there is an emergency stopping of the operation of the engine or a failure of the latter to start.

8th. A push button (8) for causing the starting of the engine at will.

The polarized relay is preferably so constructed that its armature locates itself in one of two positions, namely, 1st, a normal position, where it completes a circuit through the winding of the voltage controlled or wound thermostat blade of element (2ª), and, 2nd, a reverse position where the current is passing from the battery to the generator as during engine starting and in which it establishes a circuit or circuits through the winding of the bifurcated blade of safety cut-out device (2ᵇ); and once thrown to either of these positions it tends to remain until shifted by a change of the direction of flow of the current in the generator circuit. That is, if the bifurcated blade heats up sufficiently to operate as a cut-out, the armature of the polarized relay remains in the position it then occupies, and inasmuch as said armature is ordinarily relatively inaccessible and not intended to be manually operated, it is desirable to provide an additional switch or push button (8) for initiating starting conditions in the apparatus independent of the position of the polarized relay armature. On the other hand, if the apparatus is thrown out of operation by the normal action of the thermostatic element (2ª) due to the rise in voltage of the battery, the armature of the polarized relay remains in normal starting position.

The co-ordination and operation of the various parts may now be more fully pointed out, it being understood that the battery is connected to the power consuming devices, for example, the lights 10, through the medium of the conductors 11—12, the blades 13—14 of a double pole service switch, the conductors 15—16, and the fuses 17—18.

*Normal thermostat heating circuit, voltage within proper limits.*—Assuming that the voltage of the battery (1) is within the limits to which the low voltage thermostat blade 21 and the high voltage thermostat blade 22 are adjusted, say 102 volts and 122 volts in the event the power consuming devices are of the 110 volt type, and that the armature of the polarized relay (5) is in counterclockwise position, current will flow (Fig. 6) from the positive pole of the battery through the conductor 11—13—15, the conductor 24, the armature 25 of the polarized relay (5), the contact 26, and the conductor 27, through the winding 28′ of the thermostat blade 28 and the conductor 29—12 back to the battery; and the blade 28 is deflected either toward the blade 21 or toward the blade 22 depending on whether the battery voltage is below or above normal.

Figure 2:
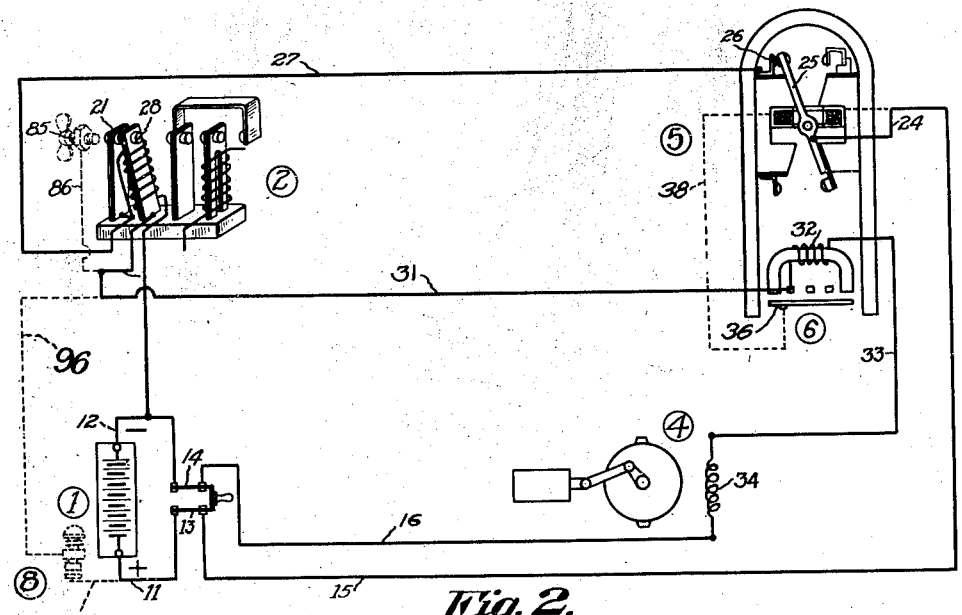

*Engine starting—low battery voltage.*—The voltage in the battery dropping to the permissible minimum (102 in the case stated), the blade 28 makes contact with the blade 21, Fig. 2, and a flow of current takes place through the conductor 11—13—15, conductor 24, armature 25, contact 26, conductor 27, thermostat blades 21—28, conductor 31, the winding 32 of the relay or main contactor (6), the conductor 33, field 34 of the generator (4), and the conductor 16—14—12 back to the negative side of the battery, thereby exciting the field of the generator and energizing winding 32.

Figure 3:
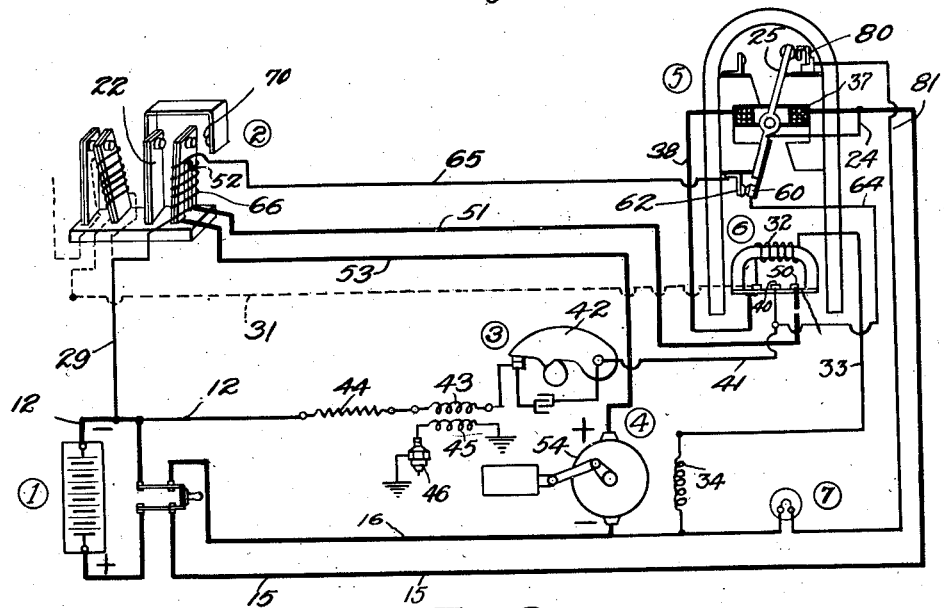

Upon the energization of winding 32 the bar armature 36 is attracted as shown in Fig. 3 to establish an engine cranking circuit from the positive side of the battery (1) through the conductor 15, the series winding 37 of the polarized relay (5), and the conductor 38 to the bar 36 of the main contactor (6), (the conductor 38 being always in electrical connection with the bar 36), then through the contact 50 and conductor 51, through the furcations of the blade 52 of the thermal safety cut-out device (2$^b$), conductor 53, armature 54 of generator (4), and conductor 16 to the negative side of the battery. This cranking circuit is shown in heavy lines in Fig. 3.

At the same time an ignition circuit is established from the bar 36 through the contact 40, conductor 41, breaker 42, primary coil 43, resistance unit or coil 44 and conductor 12 to the negative side of the battery, and acts on the secondary coil 45 and spark plug 46. If the engine and associated parts are in normal operating condition, the ignition will be in position to cause the operation of the engine on the latter being cranked.

It will be observed that current also flows from bar 36 through coil 32 and field winding 34 and thence to the negative side of the battery, thereby establishing a supplementary or holding circuit through coil 32 to hold bar 36 in attracted position even after the original energizing circuit through 32 has been broken by the separation of contact blades 21—28 or at contact 26, as hereinafter explained.

The field 34 having previously been excited and the ignition circuit being energized, as explained heretofore, the current passing through the armature 54 causes it to act as a motor, cranking the engine to which it is attached.

*Engine failure.*—The current flowing for motoring purposes, however, swings the armature 25 of the polarized relay (5) clockwise, Fig. 3, to cause the contact 60 (carried thereby and insulated therefrom at 61) to touch the rigid back contact 62, and thereby send current from the bar 36 through contact 40, conductor 64, contacts 60—62, conductor 65 to the winding 66 of thermostat blade 52, from which it passes to the negative side of the battery through the conductor 29—12. This circuit through winding 66 may be termed a shunt safety cut-out circuit. That portion of the cranking circuit which passes through the furcations of the blade 52, as heretofore described, constitutes what may be termed a series safety cut-out circuit.

The bifurcated thermostat blade 52 is of course heated through the shunt winding 66, and approaches the overhanging contact 70, which is mechanically and electrically connected to the high voltage blade 22. If the generator should be driven as a motor for more than a predetermined time, say one minute, the element 52 will make contact with the contact 70, in which case current will flow, Fig. 7, through the conductor 15, coil 37 of the polarized relay, conductor 38, armature or bar 36, contact 50, conductor 51, one side of the bifurcated blade 52, contact 70, high voltage blade 22, conductor 71, generator field 34 and conductor 16—14—12 to the negative side of the battery. Inasmuch as this circuit does not include the winding 32 of the main contactor (6), and is of relatively small resistance, current will be diverted from the winding 32 and the bar or armature 36 will drop and thus open the cranking circuit at contact 50, and the ignition and shunt safety cut-out circuits at contact 40.

Figure 5:
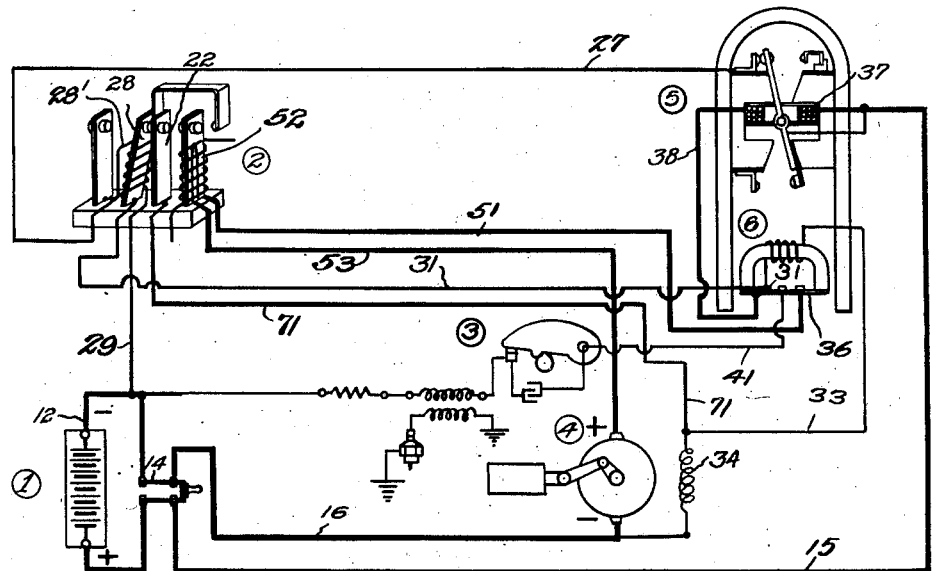
Figure 6:
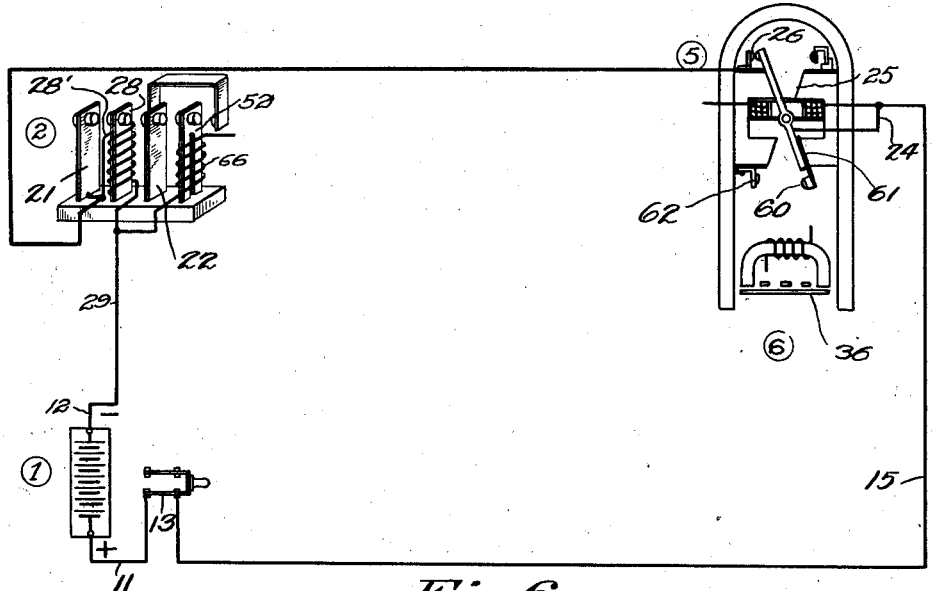

There are occasions possible where through failure of lubrication or the breakage of parts the effort of the generator acting as a motor to crank the engine may be futile, that is, the armature will be prevented from rotating. In this case, a relatively large amount of current will flow from the battery through the armature because of the low resistance of the latter. This current, passing through the metal of the bifurcated thermostat blade 52, as shown in Fig. 5, will in the course of a few seconds establish the circuit above outlined and shown in Fig. 7; and its effect is thus to cause the opening of the contacts on the main contact relay (6) since it diverts the current away from the winding 32. Under the conditions of heavy current flow just described, the contacts of the main contactor would be very likely to be destroyed or injured by the arc created in the attempt to rupture a current of this magnitude. In order to prevent this destruction or injury, the contacts of the relay (6) are placed within the magnetic field produced by the permanent magnet 75. When the magnetic and electric relations are such that when the right limb of the magnet as viewed on Fig. 1 is of north polarity and the circuit is as previously described, the arc when established will be actuated violently by the magnetic field in such a manner as to cause it to move upward from the diagram. This causes such an extreme elongation of the arc that it is very quickly ruptured without injury to the parts.

Figure 4:
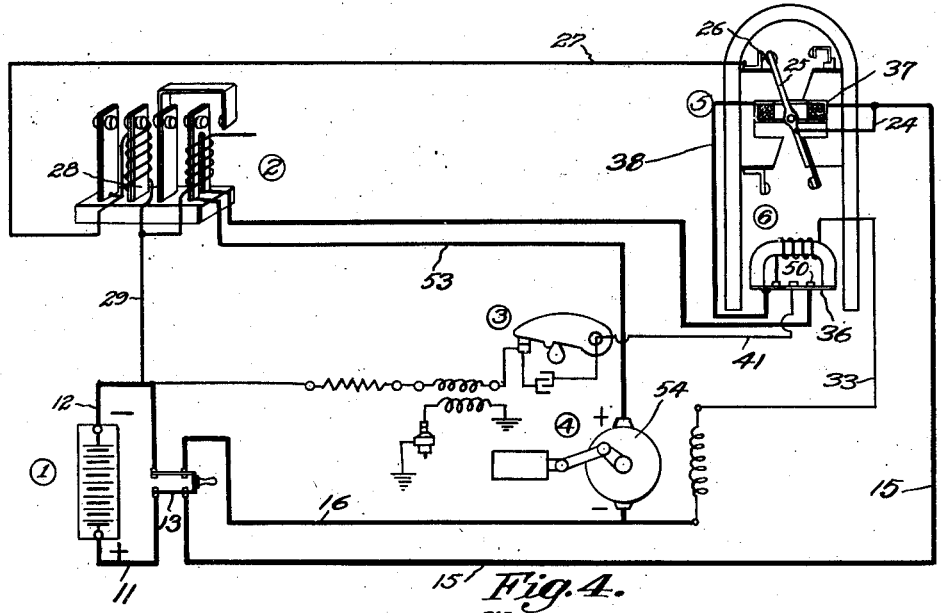

*Battery charging.*—While the safety cut-out features, the operation of which have just been described, are important from a practicable standpoint in preventing possible damage to the battery in the event of engine failure; it will be understood that if the apparatus receives a reasonable amount of care and attention the cut-out devices will not come into operation but the engine will normally become self-operative and cause a reversal of current in the cranking circuit within the predetermined time, and in that event the armature 25 will immediately swing from the position shown in Fig. 3 to its normal or counter clockwise position to establish the circuits shown in Fig. 4. Referring to this figure it will be seen that the shunt safety cut-out circuit 65 and the alarm circuit 81 (to be hereinafter described) are now interrupted and the normal thermostat heating circuit through armature 25 and circuit 27 has been reestablished. The armature 54 is now charging the battery.

*Engine stopping—high battery voltage.*— The temperature of the voltage control blade 28, as heretofore pointed out, is dependent on the current flowing (Fig. 5) through the conductor 15—24, armature 25 of polarized relay (5), contact 26, conductor 27, the winding 28' of said blade, conductor 29—12 to the negative side of the battery. When through the charging operation the battery shall have reached the desired maximum voltage, this current will attain such value that the temperature produced thereby will cause the blade 28 to approach and finally affect a contact with the blade 22, Fig. 5.

When this takes place, the current from the coil 37 goes through the conductor 38, bar or amature 36, contact 31', conductor 31, to the wound voltage control blade 28, to and through the high voltage blade 22, conductor 71, generator field 34, and conductor 16—14 —12 to the negative side of the battery. The current is thus diverted from the winding 32 of the main contactor (6); it therefore de-energizes and permits the bar armature 36 to fall, thereby opening all circuits except the normal thermostat heating circuit, see Fig. 6, which remains operative and ready to again initiate engine starting when the voltage falls off sufficiently to cause the thermostat blade to move into contact with low voltage blade 21 as already explained in connection with Fig. 2.

*Minimum environment temperature control circuit.*—In the event the environment temperature were permitted to fall too low, the system might fail to start or might become inefficient through any one of several causes, such, for example, as the failure of the fuel to properly vaporize, the congealing of the cooling oil or other liquid for the engine, or the freezing and consequently destruction or impairing of the battery. Moreover, even where freezing does not take place, the internal resistance of a battery increases rapidly as the temperature falls, and it becomes desirable, therefore, where the likelihood of objectionably low temperatures exists, to provide for starting up the engine whenever the temperature falls to a minimum predetermined safe point, so that the resulting engine heat may serve to maintain the immediate surroundings above the danger line.

This is accomplished in the present case by providing a rigid or temperature-independent contact such as the screw 85, Fig. 2, preferably adjustable toward and from the low temperature thermostat blade 21 and adapted to co-operate therewith at the predetermined minimum temperature to complete the initial starting circuit through the main contactor winding and generator field as follows:— conductor 11—13—15, armature 25, contact 26, conductor 27, blade 21, contact 85, conductor 86—31, winding 32, conductor 33, generator field 34, and conductor 16—14—12, whereupon the engine will start in the manner heretofore described and will continue to run until the blade 28 contacts with the blade 22, as will be readily understood from the foregoing.

*Reverse current or polarized relay.*—It will be observed that a feature of the polarized relay shown is that the armature 25 is definitely in one of two positions depending upon the most recent history of the direction of flow of current in the coil 37, that is, either in its extreme counterclockwise position under normal operating conditions, or in the extreme clockwise position under adverse or abnormal conditions, even though no current is flowing through the coil 37. This is due to the magnetism inherent in the pole pieces of the permanent magnetic circuit.

It will further be understood that the flow of current through the coil, besides determining the position of the armature, tends to increase the contact pressure in the position determined by the direction of flow of current.

(*a*) *No current flowing.*—When no current is flowing through the series coil 37 the polarity of the armature 25 is determined by the permanent magnetism; and the amount of magnetism flowing from limb to limb of a permanent magnet is greatest when the armature 25 is closest to the pole pieces regardless of which position it occupies, that is, clockwise or counterclockwise. Any tendency, therefore, to move this armature away from the pole piece will tend to cause a diminution in the amount of magnetism flowing and must overcome the opposition of the magnetic attraction which tends to hold it definitely in position; and if it be assumed that no current is flowing through the winding 37, it is clear that the armature will remain in touch with that contact 26 or 80 with which it was in engagement when the current was interrupted.

(b) *Battery driving generator.*—Let it be assumed that the right limb of the permanent magnet 75 is north and the left limb south; and that the series coil 37 is so wound that current from the positive side of the battery through conductor 15, in going around the series coil 37 to the conductor 38, passes above the armature 25 (that is, nearer the observer than the plane of the paper) when going to the left and below said armature (that is, beyond the plane of the paper) when returning to the right: This will magnetize the armature 25 in such a direction as to make the top end of it of south polarity and the bottom end of north polarity. Supposing the armature 25 is in its normal or counterclockwise position, it is evident that the flow of magnetism from the north pole of the permanent magnet to the south pole through the armature 25 is under these circumstances resisted by the action of the current in the series turns, and that the natural tendency to establish the path of least magnetic resistance will cause the armature to swing clockwise to the position indicated in Fig. 3 whenever the current flows from the battery to the generator, and to thereupon complete the circuits through the winding of the thermostat blade 52, as heretofore explained.

(c) *Generator charging battery.*—On the other hand, let it be assumed that the generator is operating to charge the battery, Fig. 4; and that the armature 25 is in clockwise position: Current then flows from the armature 54 through the conductor 53, bifurcated thermostat blade 52, conductor 51, contact 50, bar 36, and conductor 38, through the series winding 37 (in the opposite direction from that referred to in the previous paragraph), conductor 15—13—11, to the positive side of the battery, thereby reversing the magnetism in the armature 25 and causing the latter to swing into the counterclockwise position to complete the voltage control thermostat circuit indicated in Fig. 4.

Figure 7:
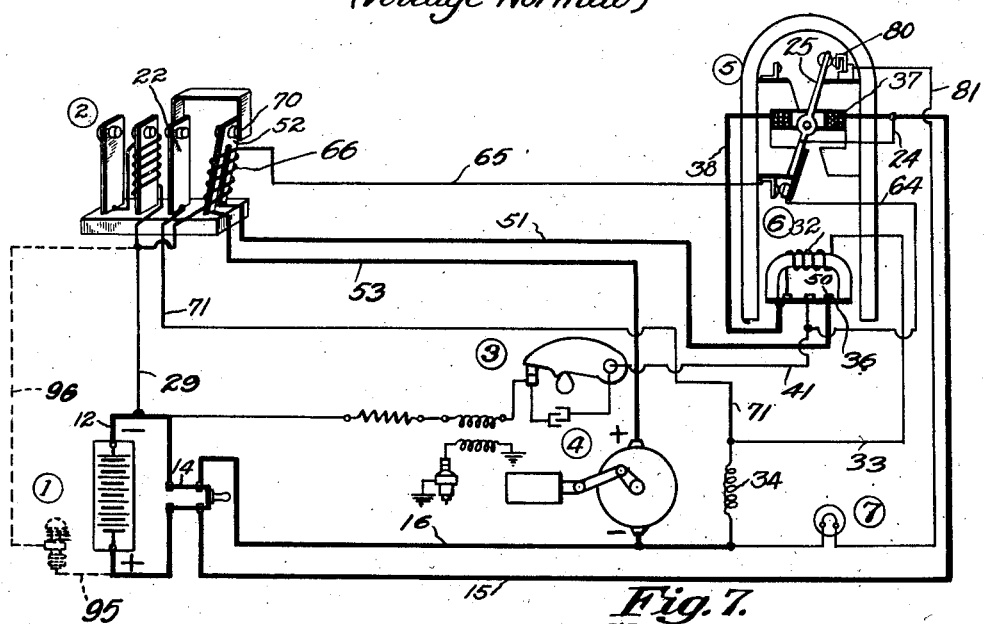

*Alarm circuit.*—Whenever the main contact relay (6) has been opened and the generator disconnected from the battery through the operation of the safety cut-out blade 52 during engine cranking, the armature 25 will be left in its clockwise or reverse position, as shown in Figs. 3 and 7, the armature in this position being in contact with contact 80 and establishing an alarm circuit as follows: from the positive side of battery (1), through conductors 15 and 24, armature 25, contact 80, conductor 81, signal lamp, bell, or horn (7), through conductor 16 to negative side of the battery. It will be observed from Fig. 3 that this alarm circuit is established when the engine cranking circuit is first closed and that the alarm circuit is thus closed during the period of engine cranking. The alarm circuit is opened as soon as the generator begins charging the battery but remains closed if the engine fails to start. In this connection it will be noted that should the engine become self-operative to charge the battery thereby opening the alarm circuit, and the generator voltage thereafter falls so that current discharges from the battery through the generator, then the armature 25 will again swing to its clockwise position and reestablish the alarm circuit and the shunt safety cut-out circuit through winding 66 which latter will soon operate to disconnect the generator and stop the engine in the manner already described.

*Manual starting circuit.*—In the event the system is disconnected through the operation of the safety cut-out thermostat blade 52, it is evident from the above that the armature 25 will be left in clockwise position with the alarm circuit closed; and that the circuits thus far described contain no means whereby the engine may again be manually started except that the user might manually act directly on the armature to swing the latter—something which is not desirable for obvious reasons, particularly when the failure is due to lack of fuel. It is, therefore, advisable to provide convenient manually controlled means for starting the generator as a motor to crank the engine, after which the voltage control blade 28 will contact with the high voltage blade 22 to cause the dis-connection of the system, as an incident to which the armature 25 remains in counterclockwise position. One inexpensive and suitable means for accomplishing the desired purpose consists in a push button or switch (8), Figs. 2 and 7, connected to the positive side of the battery by the conductor 95 and adapted to complete a field and main contactor winding circuit through the conductor 96, conductor 31, main contactor winding 32, conductor 33, generator field 34, and conductor 16—14—12 to the negative side of the battery, whereupon the bar 36 closes upon its contacts to complete the generator armature and safety cut-out circuits and the ignition circuit, as will be readily understood.

*Recapitulation.*—It will be observed that the mechanism illustrated comprises primarily four main units, namely, the battery (1), the thermal control unit ($2^a$), ($2^b$), ($2^c$), the generator unit (4), and the relay unit (5), (6); that the units ($2^a$), ($2^b$), ($2^c$) and (6), (7) are exceedingly compact and of simple construction, permitting assembly of the entire device in a small space; that the device as a whole is automatic and self-protective; and that the several units are of such nature as to be manufactured readily and at small expense.

We are of course aware that the invention is susceptible of wide variation; likewise, for certain purposes it is not necessary that all of the four leading units be present. In accordance with the patent statutes we have shown what we regard as the most desirable embodiment of all the features of the invention, but we do not wish to be limited except as indicated by the subjoined claims.

We claim:—

1. An electrical system comprising a battery, a current source adapted to charge the same, means for establishing an electrical connection between the current source and the battery, and means for controlling said electrical connection, said means including a thermostatic member, a pair of contacts cooperating therewith and compensating means for preventing movement of said contacts relative to one another with variation of the environment temperature.

2. An electricity generating and storing system comprising a battery, a generator in electrical connection with and arranged to charge the battery, and thermostatic means connected to the battery and responsive to the condition of charge of the battery for controlling said electrical connection, said means having provisions for compensating it against variation as a direct result of variation of the environment temperature.

3. An electricity distributing system comprising a normal source of electricity, a second source of electricity, and a voltage controlled device for determining the relation of the second source of electricity to the normal source, said device having provisions for compensating it against variation as a direct result of variation of the environment temperature 4. An electricity distributing system comprising a first source of current of relatively low voltage, a second source of current of relatively high voltage adapted for supplying energy to the first named source, and means, including an environment temperature compensated thermostat device heated by current from said first named source, for initiating said supply of energy to said source when the voltage thereof falls to a predetermined value.

5. A system of electrical distribution including a plurality of sources of electricity, electrical connections for said sources, and means for determining the relation between said sources, said means including thermostatic elements arranged to preserve a substatially constant relation to each other when their temperatures are equal, regardless of the absolute values of said temperatures, one of the elements being heated by current from one of said sources to increase its temperature relatively to that of the other element, and means for utilizing the relative movement of said elements due to said relative change in temperature, whereby the functioning of said means is made dependent on the voltage of said current.

6. An electricity distributing system comprising a first and a second source of electricity and a circuit associated therewith, a relay controlling said circuit, a circuit for the relay, a thermostatic element controlling said relay circuit, and a contact associated with said element through which the electrical condition of said relay circuit is changed when the environment temperature falls to a predetermined degree, thereby controlling the electrical relation between said sources.

7. An electricity distributing system comprising a battery, a generator-engine set, the generator part of which is arranged to be driven as a motor by current from the battery to thereupon crank the engine and also adapted to thereafter be driven by the engine to supply current to the battery, a circuit for the battery and generator, a relay controlling said circuit, a circuit for the relay, a thermostat controlling said last named circuit, and a contact associated therewith to change the electrical condition of said relay circuit when the surrounding temperature falls to a predetermined degree.

8. An electricity generating system comprising a battery, an engine, a dynamo-electric machine operatively connected with the engine and adapted to be driven by current from the battery to crank the engine, a main circuit connecting the battery with the dynamo-electric machine, and means for automatically disconnecting the battery from the dynamo-electric machine in the event of abnormal conditions resulting in failure of the engine to start, said means comprising a switch in said main circuit, an electromagnet controlling said switch and having a winding, a control circuit including said winding and adapted to be connected with said battery to energize said winding, and a bimetallic thermostat element connected in said main circuit and responsive to current demand by the dynamo-electric machine to control the current through said winding whereby to effect opening of said switch and disconnection of the dynamo-electric machine from the battery.

9. An electricity generating system comprising a battery, an engine, a dynamo-electric machine operatively connected with the engine and adapted to be driven by current from the battery to crank the engine, a circuit connecting the battery and dynamo-electric machine and including thermostatic means, means whereby said thermostatic means is subject to a relatively slow increase in temperature to divert current from said circuit when a relatively small current of relatively high voltage passes through said circuit, and additional means for increasingly heating the thermostat to divert current from said circuit when the amount of current flowing through said circuit is increased.

10. An electricity distributing system comprising a first and a second source of electricity, a circuit connecting said sources and controlled by thermostatic means, said thermostatic means being movable from inactive controlling position to active controlling position, means whereby said thermostatic means is subjected to a relatively small increase in temperature to slowly move from inactive to active controlling position when a predetermined voltage is impressed on said circuit, and additional means for increasingly heating the thermostatic means to cause more rapid movement from inactive to active controlling position when a predetermined amperage flows through said circuit.

11. An electricity distributing system comprising a first and a second source of electricity, a circuit connecting said sources and including a thermostatically controlled element, and a circuit for actuating the thermostat thereof at one rate under conditions of predetermined voltage on the first named circuit, said thermostat being actuated at another rate when a predetermined amperage flows through said first named circuit.

12. An electricity distributing system comprising a working circuit, a source of electricity connected thereto through a thermostatically controlled element, and a circuit for actuating the thermostat thereof under conditions of predetermined voltage on the first named circuit, said thermostat being also responsive to the amount of current flow through said first named circuit.

13. In combination with an electric motor having a field circuit and an armature circuit, means for establishing the field circuit, means controlled by the field circuit for establishing the armature circuit, and means for interrupting the field circuit in the event the armature circuit is not established within a proper time.

14. In combination with an electric motor having a field circuit and an armature circuit, means for establishing the field circuit, means controlled by the field circuit for establishing the armature circuit, means for accomplishing a delayed interruption of both circuits in the event the armature circuit is not established within a proper time and for more quickly interrupting said circuits in the event the armature does not function properly.

15. An electricity distributing system comprising a battery, a generator-engine set arranged to charge the battery, a circuit connecting the battery and generator-engine set, a main relay for completing said circuit, a controlling circuit for the main relay, a thermostat associated therewith, a polarized relay arranged, when the generator is charging the battery, to direct current to said controlling circuit to heat said thermostat, said polarized relay including a magnet, said main circuit having a contact in the field of said magnet and so arranged in respect thereto as to form a magnetic blow-out for the arc formed when the main circuit is broken at the main relay.

16. An electricity distributing system comprising a main circuit, a cut-out for the main circuit, a control circuit for the cut-out, a polarized relay operatively connected to one of said circuits and associated with said cut-out to operate as a magnetic blow-out for the arc formed at the latter.

17. An electricity generating and storing system comprising a battery, a generator adapted to charge the battery, means, including a thermostat device heated by current from the battery, for establishing electrical connection between the field of said generator and the battery when the voltage of the latter falls to a predetermined value, and means for manually establishing said electrical connection at will.

18. An electricity distributing system comprising a battery, a generator-engine set arranged to charge the battery, a circuit connecting the battery and generator-engine set, a main relay for completing said circuit, a controlling circuit for the main relay, a polarized relay arranged to direct current to said controlling circuit when the generator is charging the battery, said polarized relay and said main relay being so arranged that the former operates as a magnetic blow-out for the arc formed at the latter when the main circuit is broken.

19. An electricity generating system comprising a battery, an engine, a dynamo-electric machine operatively connected with the engine and adapted to be driven by current from the battery to crank the engine, and means for automatically disconnecting the battery from said dynamo-electric machine in the event of fruitless cranking of the engine, said means being arranged to operate either after a predetermined time of engine cranking or in response to the amount of cranking current flowing from the battery to the generator.

20. An electricity generating system comprising a battery, an engine, a dynamo-electric machine operatively connected with the engine and adapted to be driven by current from the battery to crank the engine, and means for automatically disconnecting the battery from said dynamo-electric machine in the event of fruitless cranking of the engine, said means being arranged to operate either after a predetermined time of engine cranking or in response to the amount of cranking current flowing from the battery to the generator, said means including a circuit connected across the battery.

21. An electricity generating system comprising a battery, an engine, a dynamo-electric machine including armature and field circuits and operatively connected with the engine and adapted to be driven by current from the battery to crank the engine, a main circuit connecting the battery with the dynamo-electric machine, and means for automatically disconnecting the battery from the dynamo-electric machine in the event of abnormal conditions resulting in failure of the engine to start, said means including a switch in said main circuit, an electromagnet controlling said switch and having a winding connected in said field circuit, and means including a second field circuit for modifying the action of said electro-magnet to effect opening of said switch.

22. An electricity generating and storing system comprising a battery, a generator-engine set the generator part of which is adapted to be driven as a motor by current from the battery to crank the engine and to thereafter operate as a generator for charging the battery, a circuit connecting the battery and generator, a thermostatically controlled interrupter for said circuit, and a reverse current relay operating upon a flow of cranking current therethrough to close a circuit to heat the thermostat of said interrupter when the generator is driven as a motor.

23. An electricity generating and storing system comprising a battery, a generator-engine set the generator part of which is adapted to charge the battery, a circuit connecting the battery and generator, an interrupter for said circuit, means responsive to the state of charge of the battery for interrupting said circuit, and means responsive to the direction of current flow in said circuit for rendering either said interrupter or said first-mentioned means inoperative.

24. An electricity generating and storing system comprising a battery, a generator-engine set the generator part of which is adapted to charge the battery, a circuit connecting the battery and generator, means responsive to the state of charge of the battery for interrupting said circuit, and means controlled by the direction of current in said circuit for rendering said first-mentioned means inoperative.

25. In combination, a hydro-carbon engine including means for supplying an explosive fuel mixture thereto, a starting motor therefor, a supply circuit for the motor including a storage battery; means responsive either to the condition of charge of the battery or to a predetermined temperature for controlling said circuit to initiate the operation of the engine, and responsive to the condition of charge of the battery to discontinue the operation of the engine.

26. In combination, a hydro-carbon engine including means for supplying an explosive fuel mixture thereto, a starting motor therefor, a supply circuit for the motor including a storage battery, means responsive either to the condition of charge of the battery or to a predetermined temperature for controlling said circuit to initiate the operation of the engine.

27. An electricity generating system comprising a battery, an engine, a dynamo-electric machine operatively connected with the engine and adapted to be driven by current from the battery to crank the engine, a main circuit connecting the battery with the dynamo-electric machine, and means for automatically disconnecting the battery from the dynamo-electric machine in the event of abnormal conditions resulting in failure of the engine to start, said means comprising a switch in said main circuit, a control circuit normally closed during engine cranking, an electromagnet controlling said switch and having a winding connected in said control circuit and energized thereby, and a thermostat element connected in the main circuit and responsive to current flow therein to modify the action of said electromagnet whereby to effect opening of said switch.

28. An electricity generating system comprising a battery, an engine, a dynamo-electric machine operatively connected with the engine and adapted to be driven by current from the battery to crank the engine, a main circuit connecting the battery with the dynamo-electric machine, and means for automatically disconnecting the battery from the dynamo-electric machine in the event of abnormal conditions resulting in failure of the engine to start, said means comprising a bifurcated bimetallic thermostat member connected in current-conducting relationship in said circuit, and adapted to have both legs thereof normally connected in said circuit.

29. An electricity generating system, comprising an engine, a generator driven by the engine and adapted to supply current to said system, means including a relay responsive to a demand for energy from said generator for starting the engine, and means responsive to a predetermined low temperature and operating through said relay for also starting the engine.

30. In a cut-out switch for a gas engine operated electric light and power plant having a starting motor for starting the gas engine, a motor circuit including the starting motor, a solenoid switch controlling the motor circuit, a thermostat element included in the motor circuit and capable of slowly responding to the current flow therethrough, a switch operated by the thermostat element when it responds to the motor starting current, and a control circuit including said switch and the solenoid of the solenoid switch.

31. In a gas engine operated electric light and power plant, a starting motor for starting the gas engine, a motor circuit including the starting motor, a solenoid switch controlling the motor circuit, a thermostat element included in the motor circuit and capable of slowly responding to the current flow therethrough, a switch operated by the thermostat element when it responds to the motor starting current, a control circuit including said switch and the solenoid of the solenoid switch, and a heating coil in a circuit also controlled by the solenoid switch and so disposed with relation to the thermostat element as to heat it.

32. An electricity generating and storing system comprising a battery, a generator-engine set, the generator part of which is arranged to be connected to the battery to start the engine and to thereafter be driven by the engine to charge the battery, a cranking circuit between the generator and battery, and means for automatically disconnecting the generator from the battery should the engine fail to start after a predetermined time, said means including a control circuit which is closed throughout the period of engine starting, and means responsive to reversal of current in said cranking circuit for opening said control circuit.

33. In combination, an engine, an electric motor adapted to crank the engine, a current supply circuit for furnishing current to said motor, and means for rendering said motor inoperative for further cranking said engine in case of fruitless cranking, said means comprising a thermostatic device responsive to the supply of cranking current to said motor, and a second thermostatic device responsive to changes in environment temperature for compensating said means against variation in operation due to such changes in environment temperature.

JAMES B. REPLOGLE.
JOHN M. LEA.